United States Patent
Jarvis

(10) Patent No.: US 6,646,240 B2
(45) Date of Patent: Nov. 11, 2003

(54) FASTENING ARRANGEMENTS

(75) Inventor: Paul E Jarvis, Preston (GB)

(73) Assignee: British Aerospace Public Limited Company, Farnborough Hants (GB)

( * ) Notice: Subject to any disclaimer, the term of this patent is extended or adjusted under 35 U.S.C. 154(b) by 0 days.

(21) Appl. No.: 10/143,892

(22) Filed: May 14, 2002

(65) Prior Publication Data

US 2002/0137390 A1 Sep. 26, 2002

Related U.S. Application Data

(62) Division of application No. 09/381,268, filed as application No. PCT/GB99/02759 on Aug. 19, 1999, now Pat. No. 6,398,450.

(30) Foreign Application Priority Data

Aug. 20, 1998 (GB) .............................................. 9818052

(51) Int. Cl.[7] .................................................. H05B 6/14
(52) U.S. Cl. ........................ 219/635; 219/662; 403/329
(58) Field of Search ................................ 219/600, 635, 219/633, 634, 647, 670, 672, 662; 403/28, 329, 289, 404; 411/361; 29/525.05, 447

(56) References Cited

U.S. PATENT DOCUMENTS

| | | | |
|---|---|---|---|
| 2,355,580 A | 8/1944 | Wing | 411/361 |
| 2,395,667 A | 2/1946 | Keller et al. | 411/361 |
| 2,510,076 A | 6/1950 | Cockrell | 411/361 |
| 3,612,803 A * | 10/1971 | Klaas | 219/635 |
| 3,951,560 A * | 4/1976 | Beer | 403/273 |
| 4,133,095 A * | 1/1979 | Lewis et al. | 219/635 |
| 4,198,895 A | 4/1980 | Ruhl | 411/361 |
| 4,234,781 A * | 11/1980 | Flink | 219/635 |
| 4,687,395 A | 8/1987 | Berecz et al. | 411/361 |
| 4,687,397 A | 8/1987 | Berecz | 411/361 |
| 4,813,807 A | 3/1989 | Mead | |
| 5,120,175 A | 6/1992 | Arbegast et al. | |
| 5,265,456 A | 11/1993 | Kennedy et al. | 29/361 |

FOREIGN PATENT DOCUMENTS

EP 131 997 1/1985

OTHER PUBLICATIONS

Patent Abstracts of Japan, vol. 018, No. 491 (M–1672) Sep. 13, 1994 & JP 06 159331 A (Hitachi Ltd.) Jun. 7, 1994.

* cited by examiner

Primary Examiner—Philip H. Leung
(74) Attorney, Agent, or Firm—Pillsbury Winthrop LLP

(57) ABSTRACT

A tool (38) secures and releases a fastening arrangement which includes a first component (10) and a second component (12) which may be releasably fastened together. Fastening is by means of a retention element (34) of shape memory material associated with the second component (12) which is reconfigurable between an open position (first and second components separated) and a closed position (first and second components fastened together). During fastening a closure element (36) urges the retention element (34) from its open position to its closed position. The tool includes a magnetic coil (44) energizable to urge the closure element (36) in a direction to cause the retention element (34) to move from its open to its closed state. The magnetic coil (44), or an additional coil, is also energizable to draw the closure element (36) away from engagement with the retention element (34). A heating coil (45) is provided for heating the retention element (34).

9 Claims, 2 Drawing Sheets

FASTENING ARRANGEMENTS

RELATED APPLICATIONS

This application is a division of application Ser. No. 09/381,268 filed Sep. 20, 1999 now U.S. Pat. No. 6,398,450 B1 which was the National Phase of International Application PCT/GB 99/02759 filed Aug. 19, 1999 and claims priority from British Application No. 9818052.4 filed Aug. 20, 1998, the contents of all of which are incorporated hereinto by this reference.

BACKGROUND OF THE INVENTION

1. Field of the Invention

This invention relates to tools for use with fastening arrangements and associated fastening kits.

2. Description of Related Art

There are many situations where it is required to connect together two items either permanently or semi-permanently and where there is access to one side only of the assembly. Examples include the attachment of panels or plates to underlying frames or supports in structures such as aircraft, ships, cars, etc. Arrangements such as captive bolts, blind rivets, rivet nuts etc., may be used in such applications. There are however disadvantages with such arrangements. For example, with rivets and captive nuts, the surface of the panel is interrupted by the head of the rivet or bolt. This interruption increases aerodynamic drag and, if the panel itself otherwise has a low radar signature, considerably increases the radar signature. In addition the exposed head of the rivet or bolt which is normally connected at its other end to a metal support structure, renders the head of the bolt or rivet susceptible to lightning strike.

BRIEF SUMMARY OF THE INVENTION

Accordingly, parent application Ser. No. 09/381,268, now U.S. Pat. No. 6,398,450B1discloses a fastener arrangement for connecting together two members, the arrangement including a first component for association with a first of the members, and a second component for association with the second of the members.

The second component includes a retention element of shape memory material configurable between a closed state in which it engages the first component to retain it, and an open state in which the first component may be withdrawn from the second component. A closure element is adapted in use to co-operate with the retention element during fastening of the arrangement to deform the retention element from its open state to its closed state.

This arrangement therefore makes use of the recovery properties of a shape memory material to reconfigure between a closed state and an open state.

The provision of a closure element facilitates the application of an external force to deform or swage the shape memory retention element around the first component.

The first component preferably includes a head means for engaging said first member and a shank means comprising an engagement region for engaging said second component, said engagement region including a region of non-constant cross section including an abutment or shoulder region for co-operation with an associated abutment region on said retention element. In one arrangement, said region of non-constant cross section is tapered in the direction away from said head means. Many geometries are possible. In particular, it should be noted that, although in the preferred embodiment, the second component fits around the end of the first, it would be possible to have an arrangement in which the second component was deformed to fill a recess or bore within the first component.

Preferably, the retention element is made of a heat recoverable shape memory metal alloy. The retention element is preferably formed such that, when in said closed state, on heating to a temperature equal to or greater than a predetermined recovery temperature, the retention element tends to recover to said open state (assuming that the retention element is otherwise unencumbered).

To allow said retention element to be heated by the application of a coil or tool remote therefrom, the retention element is preferably made of an inductive metal material, whereby said tension element may be heated by the application of an electric field.

It will be appreciated that, in the preferred embodiment, the closure element needs to be moved into and out of engagement with the retention element to open and close it. A reasonable amount of force may need to be provided and this ideally is provided without direct mechanical application. Thus the closure element is preferably formed of a ferro-electric material whereby it may be urged into or out of engagement with said retention element by the application of an external magnetic field.

SUMMARY OF THE INVENTION

According to one aspect of this invention, there is provided a tool for use in securing or releasing a fastener arrangement, which has a first component and a second component, the second component including a retention element of shape memory material adapted to be deformed releasably to retain the first component and a closure element for cooperating with the retention element to deform it.

The tool includes a magnetic field producing means for producing magnetic field of a given polarity for urging the closure element in a direction tending to cause the retention element to change from its open state to its closed state, a magnetic field producing means for producing a magnetic field for urging said closure element away from cooperation with the retention element, and a heating coil for applying at least one of inductive heating and electrical heating of the retention element.

The magnetic field producing means may include a common magnetic coil means, energizing means for energizing the coil means, and reverse switch means for changing the polarity of the energization. The magnetic field producing means conveniently includes electrical storage means and cycle control means for supplying to the coil means a short high intensity pulse thereby to produce a short, high intensity magnetic impulse.

The tool may include a further coil means for generating a magnetic field for rendering the closure element magnetic.

According to another aspect of this invention, there is provided a tool for use in securing or releasing a fastener arrangement, which has a first component and a second component, the second component including a retention element of shape memory material adapted to be deformed releasably to retain the first component and a closure element for cooperating with the retention element to deform it.

The tool includes an electromagnetic coil for producing a magnetic field of a given polarity for urging the closure element in a direction tending to cause said retention element to change from its open state to its closed state, an electromagnetic coil for producing a magnetic field for urging the closure element away from cooperation with the retention element, and a heating to coil for applying at least one of inductive heating and electrical heating to the retention element.

The electromagnetic coils may include a common coil, and associated therewith an energy force for energizing the coil, and a reverse switch for changing the polarity of the energization. The electromagnetic coil may have associated therewith a cycle control circuit for supplying to the coil a short high intensity pulse thereby to produce a short, high intensity magnetic impulse. The tool may further include an electromagnetic coil for generating a magnetic field for rendering the closure element magnetic.

In a further aspect, this invention provides a tool for use in securing or releasing a fastener arrangement, which has a first component and a second component, the second component including a retention element of shape memory material adapted to be deformed releasably to retain the first component and a closure element for co-operating with the retention element to deform it.

The tool includes electromagnetic means operable to generate an electromagnetic field for applying to an object in the field a force in at least one of two opposed directions, and electrical heating means for generating at least one of electrical heating and inductive heating in a region adjacent the tool for heating an object in the region.

In another aspect, there is provided a method of connecting together two members, which method includes providing a fastening arrangement including a first component for association with a first of the members and a second component for association with the second of the members. The second component includes a retention element of shape memory material configurable between a closed state in which it engages the first component to retain it and an open state in which the first component may be withdrawn therefrom. The method further includes bringing together the two members, assembling the first component and the second component with the retention element initially in an open state, and urging a closure element against the retention element to change it to its closed state, thereby connecting the members.

Preferably the retention element is moved to its closed state by means of a closure element. Preferably, the closure element is moved between the fastened or relaxed states by means of an electrical and/or magnetic field. For release of the fastening, the retention element is preferably heated to a temperature equal to or greater than its recovery temperature. Heating may conveniently be by means of a high frequency electromagnetic field, or an electrical current.

Whilst the invention has been described above, it extends to any inventive combination of the features set out above or in the following description.

BRIEF DESCRIPTION OF THE DRAWINGS

The invention may be performed in various ways, and, by way of example only, an embodiment thereof will now be described in detail, reference being made to the accompanying drawings in which.

DETAILED DESCRIPTION OF THE INVENTION

The fastening arrangement described and illustrated below is intended for use for attaching a panel to a substrate in an aircraft having a low radar signature. Thus, when assembled, no part of the fastening arrangement is visible externally. This is beneficial in terms of stealth requirements, aerodynamic drag and improved resistance to lightening strike.

Figure 1:
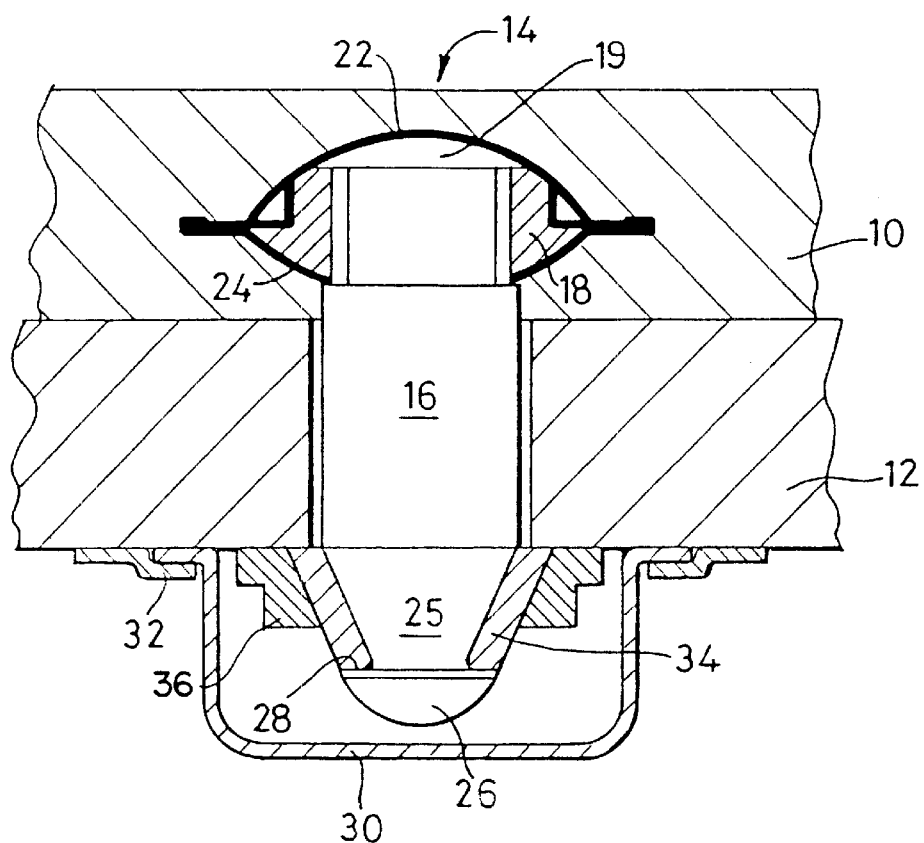
FIG. 1 is a vertical section view through an embodiment of fastener in accordance with this invention, in a fastened condition.
Figure 2:
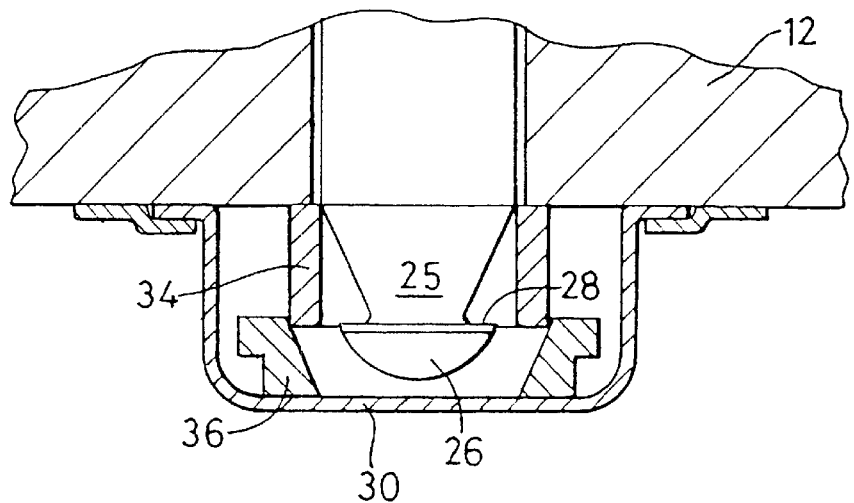
FIG. 2 is a detail view on the lower end of the fastening arrangement of FIG. 1 showing the fastening in a released condition.
Figure 3:
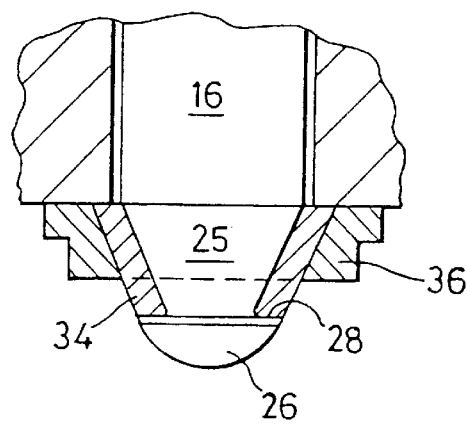
FIG. 3 is a view on the lower part of the fastening arrangement of FIG. 1 in the fastened condition.

In FIGS. 1 to 3 of the drawings, the panel 10 or first component is shown connected to a lower substrate or second component 12 by means of the fastening arrangement shown generally at 14. The fastening arrangement 14 includes a shank 16 which in this arrangement is threaded at its upper end and screwed into a head 18; other mechanical connecting systems may be employed. The head 18 is received in a pocket 19 formed in the panel 10 by moulding in situ. Within the pocket 19 in this particular arrangement is a domed cap 22 and a hemispherical liner 24 which provide sufficient clearance for the head 18 to be capable of slight angular movement for alignment purposes. The domed cap includes an anti-rotation device (not shown) for preventing rotation of the nut 18. The lower end 25 of the shank 16 is tapered, diminishing in cross section towards its free end and terminating in an enlarged domed portion 26 which provides an annular lip or recess 28. A top hat cap section 30 is secured to the lower surface of the substrate 12 by means of a retaining ring 32. The lower end 25 of the shank may take more complex shapes as required.

In FIG. 2, the second part of the fastening includes a shape memory metal collar 34 of inner diameter similar to that of the widest portion of the tapered part of the shank 16, of outer diameter substantially greater than that of the bore in the second component 12 and of axial length approximately the same as that of the tapered portion. The collar 34 is made of shape memory metal alloy; such materials have the property that, after initial machining or forming, the material may be plastically deformed into various shapes but, if heated to a temperature equal to or in excess of its recovery temperature, the article will exhibit a "memory" phenomenon whereby it tends to return to the shape as initially machined or formed. The second part also includes a ferromagnetic pressure ring 36 having a conical inner profile.

Figure 4:
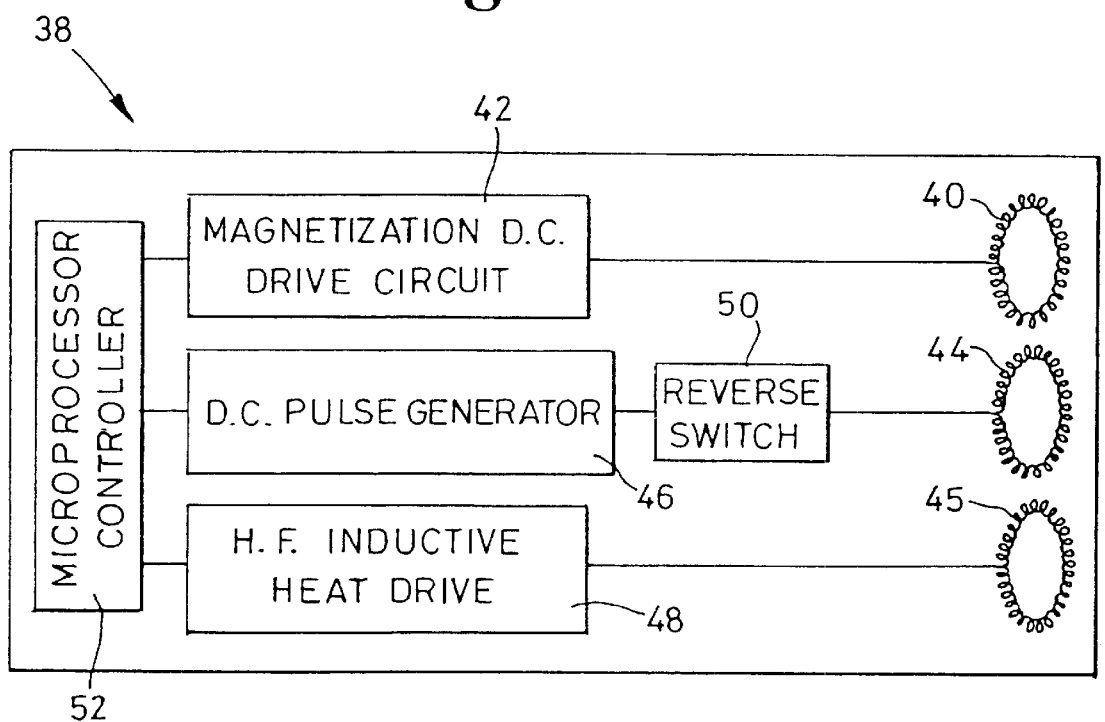
FIG. 4 is a schematic block diagram of a tool for fastening or releasing the fastening of FIGS. 1 to 3.

In operation, the panel 10 and the substrate 12 are prepared for fixing by providing the pocket 19 in the panel 10 and assembling the collar 34, the pressure ring 36 and the top hat cover 30 on the lower side of the substrate using the retaining ring 32. The shank 16 is then screwed into the head 18 and then passed through a suitably formed bore in the substrate 12 to assume the position shown in FIG. 2. Thereafter, a special tool 38 as illustrated schematically in FIG. 4 is brought next to the fastening arrangement 14 adjacent the exposed surface of the panel 10. The tool has a low-power magnetic coil 40 energised by a DC drive circuit 42. A high power magnetic coil 44 is also provided and may be energized by a DC pulse generator 46. A high frequency inductive heat drive 48 is connected to a high frequency coil 45. The DC pulse generator 46 includes an electrical energy storage device such as a capacitor and/or an inductor for generating a very high intensity pulse of short duration. A changeover switch 50 is provided so that the polarity of the pulse may be selected prior to input to the coil 44. The DC drive circuit 42, DC pulse generator 46 and the high frequency inductive heat drive 48 are controlled by a microprocessor controller 52.

With the components in the position as shown in FIG. 2, the tool 38 is manoeuvred adjacent the fastening arrangement 14 so that the low power coil 40 is generally co-axial with the shank 16, and the low power coil is energised to magnetise the pressure ring 36. Immediately thereafter the coil 44 is aligned with the arrangement 14, and a DC pulse is generated by the pulse generator 46 and supplied to the coil 44 in the appropriate sense to force the pressure ring 36 on to the collar, which pushes the collar 34 into contact with the lower substrate 12 and provides the initial clamp-up force on the joint. The pressure ring continues to move over the collar 34 with the interior conical surface thereof swaging the collar material into the retaining lips or shoulder 28 behind the domed end 26 of the lower portion of the shank 16, until the arrangement adopts the configuration shown in FIGS. 1 and 3 with the collar 34 locked at the shank 16 and providing fastener closure. Elastic relaxation of the collar 34, combined with its precise geometric form, retains the pressure ring 36.

To remove the fastener, the collar 34 needs to be expanded in diameter back to its pre-installed size to allow its removal from the shank 16. To do this, the tool 38 is brought back into the vicinity of the fastener and the low power coil 40 aligned with the arrangement 14 and used to magnetize the pressure ring 36. Thereafter the high power coil 44 is aligned with the arrangement 14 and a high energy DC pulse is applied via the generator 46 and high power coil 44 in the appropriate sense to force the magnetized pressure ring 36 off the collar 34, this item being captured by the top hat cap section 30. At this stage the retaining collar 34 is still swaged around the lower end of the shank. The high frequency inductive heat drive 48 is then energized to drive the high frequency coil 45 to heat the collar 34 of shape memory metal material to recover its original shape. The fastener and panel can then be removed.

To indicate the state of the fastener, i.e. open or closed, a dot or patch of magnetically activated colour change material is applied on the external surface of the panel 10, over the top of the fastener. This allows the hidden fastener to be located and also indicates its precise state. The magnetic colour change material responds to the proximity or otherwise of the magnetized pressure ring 36 and changes colour dependent on whether the pressure ring 36 is in the open position of FIG. 2 or the closed position of FIG. 3.

While an exemplary embodiment has been shown and described, this invention contemplates variations without limitation except as defined by the following claims.

What is claimed is:

1. A tool for use in securing or releasing a fastener arrangement, said fastener arrangement having a first component and a second component, the second component including a retention element of shape memory material adapted to be deformed releasably to retain said first component and a closure element for co-operating with said retention element to deform it, said tool comprising:

magnetic field producing means for producing magnetic field of a given polarity for urging said closure element in a direction tending to cause said retention element to change from its open state to its closed state, magnetic field producing means for producing a magnetic field for urging said closure element away from co-operation with said retention element, and a heating coil for applying at least one of inductive and electrical heating to said retention element.

2. A tool according to claim 1, wherein said magnetic field producing means comprise a common magnetic coil means, energising means for energising said coil means, and reverse switch means for changing the polarity of said energisation.

3. A tool according to claim 1, wherein said magnetic field producing means comprises electrical storage means, and cycle control means for supplying to said coil means a short high intensity pulse thereby to produce a short, high intensity magnetic impulse.

4. A tool according to any claim 1, including a further coil means for generating a magnetic field for rendering said closure element magnetic.

5. A tool according to claim 1, including an electromagnetic coil for generating a magnetic field for rendering said closure element magnetic.

6. A tool for use in securing or releasing a fastener arrangement, said fastener arrangement having a first component and a second component, the second component including a retention element of shape memory material adapted to be deformed releasably to retain said first component and a closure element for co-operating with said retention element to deform it, said tool comprising:

an electromagnetic coil for producing a magnetic field of a given polarity for urging said closure element in a direction tending to cause said retention element to change from its open state to its closed state, an electromagnetic coil for producing a magnetic field for urging said closure element away from co-operation with said retention element, and a heating coil for applying at least one of inductive and electrical heating said retention element.

7. A tool according to claim 6 wherein said electromagnetic coils comprise a common coil, and associated therewith an energy force for energising said coil, and a reverse switch for changing the polarity of said energisation.

8. A tool according to claim 7 wherein said electromagnetic coil has associated therewith a cycle control circuit for supplying to said coil a short high intensity pulse thereby to produce a short, high intensity magnetic impulse.

9. A tool for use in securing or releasing a fastener arrangement, said fastener arrangement having a first component and a second component, the second component including a retention element of shape memory material adapted to be deformed releasably to retain said first component and a closure element for co-operating with said retention element to deform it, said tool comprising:

electromagnetic means operable to generate an electromagnetic field for applying to an object in said field a force in at least one of two opposed directions, and electrical heating means for generating at least one of electrical and inductive heating in a region adjacent said tool for heating an object in said region.

* * * * *